United States Patent [19]

Osuna-Diaz

[11] Patent Number: 5,141,696

[45] Date of Patent: Aug. 25, 1992

[54] METHOD FOR INJECTION MOLDING USING FLOW ADJUSTING ARRANGEMENT

[76] Inventor: J. M. Osuna-Diaz, 2365 Avon Industrial Dr., Auburn Heights, Mich. 48057

[21] Appl. No.: 177,919

[22] Filed: Mar. 21, 1988

Related U.S. Application Data

[63] Continuation-in-part of Ser. No. 880,567, Jun. 30, 1986, abandoned.

[51] Int. Cl.[5] .............................................. B29C 45/30
[52] U.S. Cl. ................. 264/297.2; 264/328.8; 264/328.9; 425/562
[58] Field of Search ............... 264/297.2, 328.1, 328.8, 264/328.9, 328.12, 328.15, 328.16; 425/145, 149, 549, 562, 564, 566, 588

[56] References Cited

U.S. PATENT DOCUMENTS

| | | |
|---|---|---|
| 2,672,653 | 3/1954 | Simpkins et al. .................. 425/572 |
| 3,561,062 | 2/1971 | Goron . | |
| 4,004,871 | 1/1977 | Hardy ................................ 425/243 |
| 4,222,733 | 9/1980 | Gellert et al. ..................... 425/566 |
| 4,268,240 | 5/1981 | Rees et al. ........................ 425/548 |
| 4,279,582 | 7/1981 | Osuna-Diaz ...................... 425/166 |
| 4,303,382 | 12/1981 | Gellert ............................. 425/566 |
| 4,378,963 | 4/1983 | Schouenberg .................... 425/549 |
| 4,466,934 | 8/1984 | Cane et al. ....................... 264/106 |
| 4,501,550 | 2/1985 | Nikkuni ........................... 425/549 |
| 4,579,520 | 4/1986 | Gellert ............................. 425/549 |
| 4,592,711 | 6/1986 | Capy ................................ 425/144 |
| 4,595,552 | 6/1986 | Hahn ............................. 264/328.1 |

Primary Examiner—Jill L. Heitbrink
Attorney, Agent, or Firm—John R. Benefiel

[57] ABSTRACT

An engagement for mechanically adjusting the flow through each of a plurality of mold nozzles supplied by a manifold for a multicavity mold, to properly balance the flow into each mold cavity. The arrangement includes a converging opening located immediately upstream of the cavity gate opening and receiving a pin extending through the main feed passage. The position of the pin is axially adjustable by having a threaded head received in a threaded bore formed in the manifold, with a pressure sealing bushing received over the pin stem. The flow of material can be balanced by externally adjusting the position of the pin associated with each mold nozzle. A side accessible arrangement is provided in a second embodiment, in which a worm gear drive connects a transversely arranged cross rod to the adjustment pin.

3 Claims, 4 Drawing Sheets

METHOD FOR INJECTION MOLDING USING FLOW ADJUSTING ARRANGEMENT

CROSS-REFERENCE TO RELATED APPLICATION

This application is a continuation-in-part of Ser. No. 06/880,567, filed on Jun. 30, 1986, now abandoned.

BACKGROUND OF THE INVENTION

1. Field of the Invention

This invention concerns injection molding apparatus and methods and more particularly manifold supplied multicavity molds.

2. Description of the Prior Art

Injection molding is a process in which molten plastic material, pressurized by an injection machine, is directed into a mold cavity through a mold nozzle. Molds are formed with openings called gates through which the material passes in entering the mold cavity. The flow of material is controlled in so-called "open loop" systems by cycling of the injection molding machine, i.e., each cycle of the injection machine causes a predetermined volume of material to flow into the mold cavities.

Multicavity molds are sometimes used to gain greater efficiency, in which the output of the injection machine passes through runners in a manifold to each of a plurality of mold nozzles each associated with a respective mold cavity.

Difficulties are encountered in open loop systems in obtaining exactly the correct flow to each cavity In practice, balancing of the flow is obtained by "fine tuning" the gate orifices by machining the diameters to obtain the correct flow.

Another approach, as disclosed in U.S. Pat. No. 4,279,582, is to use hydraulically actuated shut off valves associated with the gates to time the duration of flow to in turn enable precise control over the volume of material flow to each mold cavity.

This first mentioned approach is tedious and time consuming and does not allow for reducing the flow in the event too much flow is inadvertently created by machining too large a gate opening.

In the second mentioned approach, greatly increased costs and complexity are associated with the incorporation of hydraulic actuators and controls needed for precisely timed gate valving means. Furthermore, the complete closing of the gate depressurizes the material in the mold cavity during curing, and shrinkage cannot be made up by additional material.

In U.S. Pat. No. 3,561,062 there is disclosed a complex sleeve valve and mating port arrangement for adjusting the flow to a downstream injection port, but this approach requires complex additional structure, and controls the flow a substantial distance from the point of injection at the gate.

If an adjustable position restriction were placed at the gate, bleeding would likely occur, since a needle could not be placed there, nor could a diverging plug cavity for absolute flow nozzles.

Furthermore, such a restriction would not allow use of the various full body, bodyless, and absolute flow nozzles.

Therefore, it is the object of the present invention to provide an apparatus and method for balancing material flows in manifold supplied multicavity molds which does not necessitate machining of the mold parts or the use of elaborate auxiliary shut off or adjustment valving systems.

It is a further object to provide such apparatus and method for balancing flows usable with standard full body, bodyless, and absolute flow nozzle configurations, which maintains pressurization of the mold cavities during curing, while insuring proper separation of the cured and uncured material.

SUMMARY OF THE INVENTION

This and other objects of the present invention which will become apparent upon a reading of the following specification and claims are achieved by means of a mechanically and infinitely adjustable position restriction placed immediately upstream of the gate opening of each mold cavity, allowing ready external flow adjustment to enable balancing of the rate of material flow to each cavity. The arrangement may be incorporated in full body, bodyless, and absolute flow mold nozzles.

In application of the invention to full body and bodyless style nozzles, an injection element is formed with a converging tapered passage just upstream of a diverging passage extending about an injection needle located just upstream of the gate. A tapered end pin is positioned within the converging taper, having its stem extending within the central passage receiving a flow of material from the manifold runner. The pin has a headed portion threadably engaging a bore in the manifold and is externally accessible to be able to adjust the pin position in the tapered opening and thereby allow finely tuned adjustment at the point of injection of material flow into each mold cavity, to thereby allow effective balancing of the rate of material flow between cavities in a multicavity mold.

The combination of a converging-diverging flow just upstream of the gate opening allows the presence of the adjustment member with the injection needle to insure proper separation of the gate. Full pressurization is continuously maintained during curing to accommodate any shrinkage occurring during curing.

The pin stem passes through a thin walled protrusion from the manifold wall, creating a pressure activated sealing engagement to prevent leakage of material from the manifold body opening through which the pin stem passes.

In application to the absolute flow mold nozzle style, the converging passage is located just upstream of the gate and diverging sprue passage in the flow tip.

DETAILED DESCRIPTION

In the following specification, certain specific terminology will be employed and particular embodiments described according to the requirements of 35 USC 112, but it is to be understood that the invention is not so limited, inasmuch as many variations are possible within the scope of the appended claims.

Figure 1:
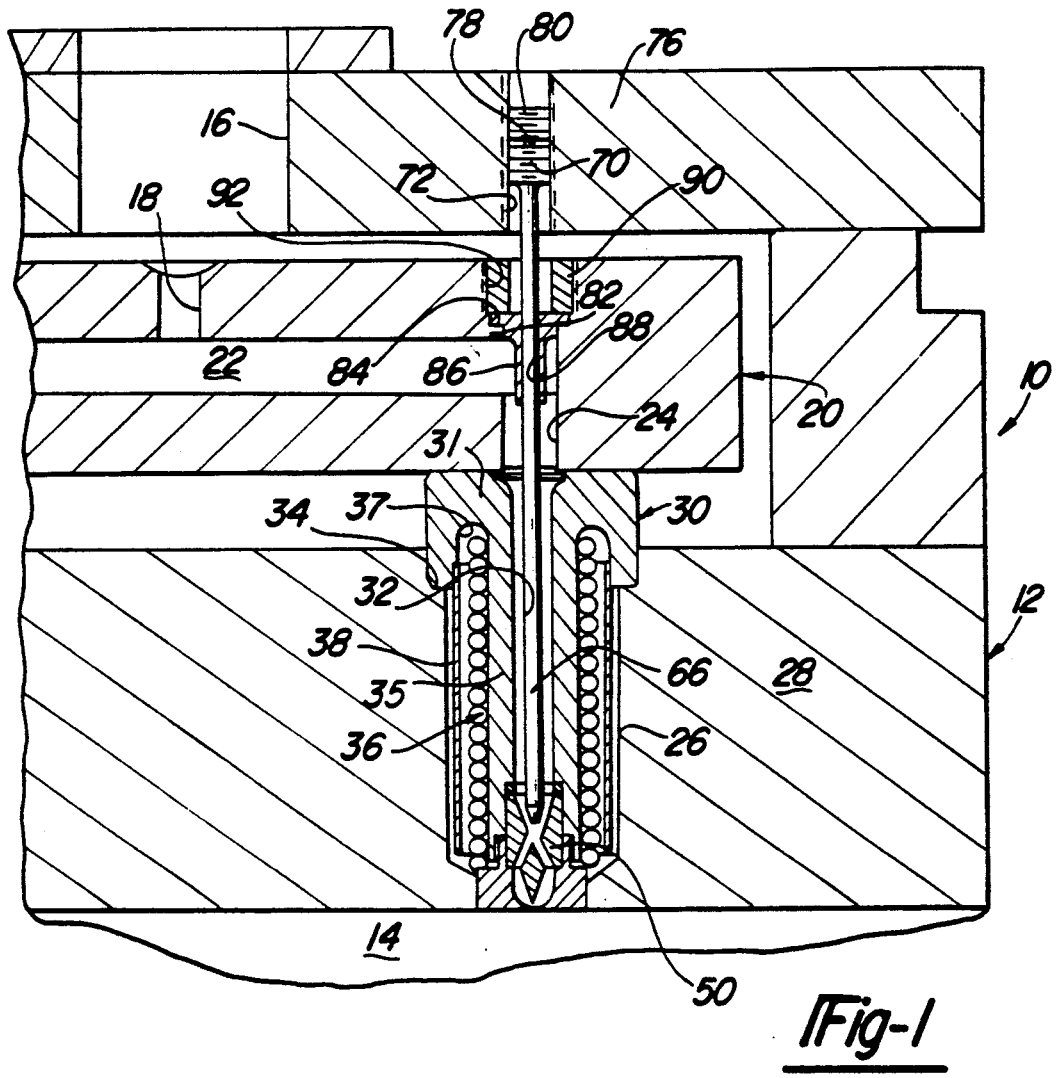
FIG. 1 is a fragmentary sectional view of an injection molding apparatus including a manifold, illustrating the details of one of the mold nozzles of the full body type, and associated mold cavity structure, which incorporate a mechanically and infinitely adjustable position restriction according to the present invention.
Figure 2:
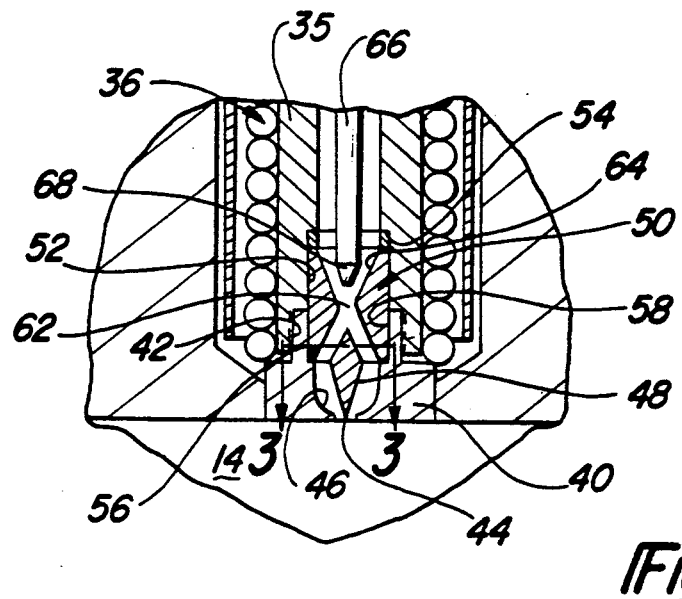
FIG. 2 is an enlarged view of the region in circle 2—2 shown in FIG. 1.

Referring to FIG. 1, a fragmentary view of a multicavity injection molding apparatus 10 is shown including a mold structure 12 defining a plurality of mold cavities 14. An opening 16 to accommodate a main injection nozzle (not shown) is aligned with an inlet passage 18 to receive a flow of material during each injection cycle. Inlet passage 18 is formed in a manifold 20 having a plurality of runner passages 22 each leading to a passage 24 associated with each mold cavity 14 and mold nozzle 26.

Each mold nozzle 26 is received in a counterbored opening in the mold plate 28. Mold nozzle 26 includes a body member 30 having a large diameter section 31 axially located by abutting against shoulder 34 formed by the counterbore in mold plate 28.

The body member 30 is formed with a central passage 32 aligned with passage 24 to receive a flow of material from runner 22.

Surrounding the smaller diameter section 35 of body member 30 are the turns of an electrical heating coil 36 which lie within a recess 37 formed in the body member 30 and continue to the very end of the body member 30 to maintain the temperature of the injected material, as described in U.S. Pat. No. 4,652,230 by the present inventor.

The heating coil 36 is encased by a cover 38 received within a counterbore in recess 37.

The mold nozzle 26 shown is of the full body type and accordingly a full body tip 40 is employed threaded into a bore 42 extending axially into the end of the small diameter section 35 of the body member 30. Tip 40 is itself formed with a gate 44 entering into the mold cavity 14. A spherical passageway 46 is formed in tip 40 immediately upstream of gate 44 and receives a needle 48 integral with needle insert 50 received in a counterbore 52 and held beneath a pilot bushing 54 received in counterbore 52 and above a shoulder 56 formed by a counterbore 58 in tip 40.

Figure 3:
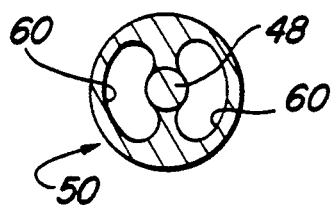
FIG. 3 is a view of the section 3-3 taken in FIG. 1.

Needle 48 is partially surrounded by kidney shaped flow openings 60 which are diverging from a central orifice 62 located upstream from needle 48 and gate 44. (FIG. 3)

A converging tapered passage 64 receives material flow from central feed passage 32 and directs the same to central orifice 62.

In order to establish an adjustable flow restriction according to the concept of the present invention, an elongated pin 66 is mounted extending within passage 32 so as to have its tapered tip 68 positioned within the converging passage 64, with its axial position infinitely adjustable to increase or decrease the restriction to thereby increase or decrease the rate of flow past pin tip 68.

The infinite adjustability is provided by means of a threaded head 70 integral with the opposite end of the pin 66 received in a threaded bore 72 formed in mold plate 76 aligned with passages 24 and 32. A screwdriver slot 78 allow ready adjustment by rotation thereof in threaded bore 72, and a locking set screw 80 also received in threaded bore 72 secures pin 66 in any adjusted position. This adjustment can be carried out externally of the mold and does not require dismantling of the mold parts to allow rapid "fine tuning" of individual flow volumes to each cavity.

The pin 66 passes out of passage 24 through which material flows and through the wall of manifold 20, and hence a suitable durable high pressure seal must be employed to prevent leakage past the pin 66 during an injection cycle. A sealing bushing 82 is tightly fit into a counterbore 84 in manifold 20, and is formed with a thin walled boss extension 86 extending into passage 24. The pin 66 is closely fit within the bore 88 and is sufficiently thin to be compressed by the pressure of the material reached during an injection cycle, such as to create a tight seal and prevent leakage past the pin 66.

A retainer socket 90 is threaded into bore 92 to keep the sealing bushing 82 tightly fit within counterbore 84.

Figure 4:
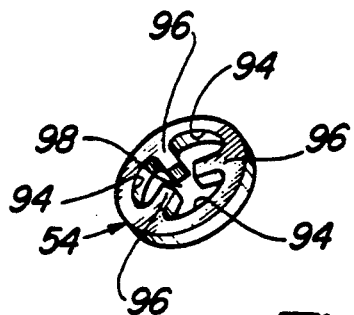
FIG. 4 is a perspective view of a centering bushing incorporated in the injection nozzle shown in FIG. 1.

Pin 66 is guided by pilot bushing 54, formed with flow passages 94 by webs 96 having radiused ends to center and guide the pin 66 in the passage 64 (FIG. 4).

Accordingly, the rate of flow to each cavity 14 may be precisely infinitely adjusted mechanically by threading of the pin to be advanced or retracted to balance out the rate of flow to insure proper flow to each cavity 14 while continuously maintaining pressurization of the material in the mold cavity during curing of the material to accommodate any shrinkage.

The combination of converging and diverging flow sections, with a restriction in the converging section allows the inclusion of the injecting needle 48 notwithstanding the presence of the restriction member 66 at the locale of the injection of material.

Figure 5:
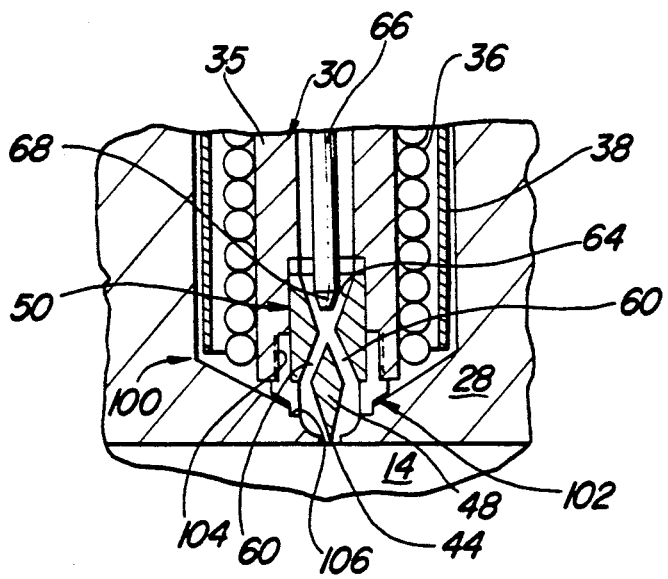
FIG. 5 is a fragmentary sectional view of a portion of a mold nozzle of the bodyless type and associated mold structure incorporating the mechanically and infinitely adjustable position restriction according to the present invention.

The same arrangement may be applied to all of the conventional mold nozzle types, as the bodyless nozzle 100 shown in FIG. 5. In this instance a bodyless tip 102 is threaded into a bore 104 extending back into the reduced diameter portion 35 of the nozzle body member 30.

The needle 48 protrudes into the gate 44 formed in the mold plate 28, with the tip 102 received in a counterbore 106 formed in mold plate 28.

As described in the above referenced patent the bodyless type nozzle results in a minimum impression on the molded article. The needle 48 is formed in needle insert 50 with kidney shaped openings 60 allowing flow past the needle 48. A coversing taper opening 64 receives the pin tip 68 as before to provide the mechanically adjustable restriction.

Figure 6:
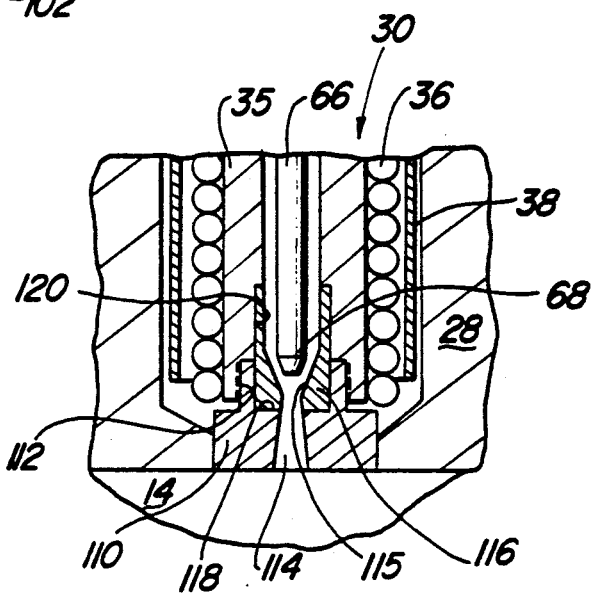
FIG. 6 is a fragmentary sectional view of a portion of mold nozzle of the absolute flow style and associated mold structure incorporating the mechanically and infinitely adjustable position flow restriction according to the present invention.

Referring to FIG. 6, application to the "absolute flow" nozzle is shown. In this instance, an absolute flow tip 110 received in threaded bore 112 is formed with a diverging section at gate 114 opening into the mold cavity. Gate 114 is aligned with an opening 115 in restriction insert 116, located upstream of the gate 114, insert 116 received in a bore 118 formed in tip 110 and recess 120 in section 35 of nozzle body 30.

Opening 115 converges towards gate 114 and receives tip 68 of pin 66, which is similarly mounted to provide a mechanically adjustable restriction.

Accordingly, it can be appreciated that a simple yet precise arrangement and method has been provided for balancing the flow through each mold nozzle in a multicavity mold by providing external mechanically and infinitely adjustable restrictions upstream of each cavity gate which balances the flow of material while continuously maintaining pressurization of the cavity during curing. This allows relatively rapid fine tuning without entailing the complexity of cylinder operated gate valves.

While the adjustment is accomplished at the injection location rather than remotely upstream, the invention is usable with conventional nozzle configurations to insure proper separation at the gate opening into the cavity.

In the above embodiment, access to the rear of the mold is required, so that removal of the mold from the fixturing is necessary to make flow balancing adjustments.

Figure 7:
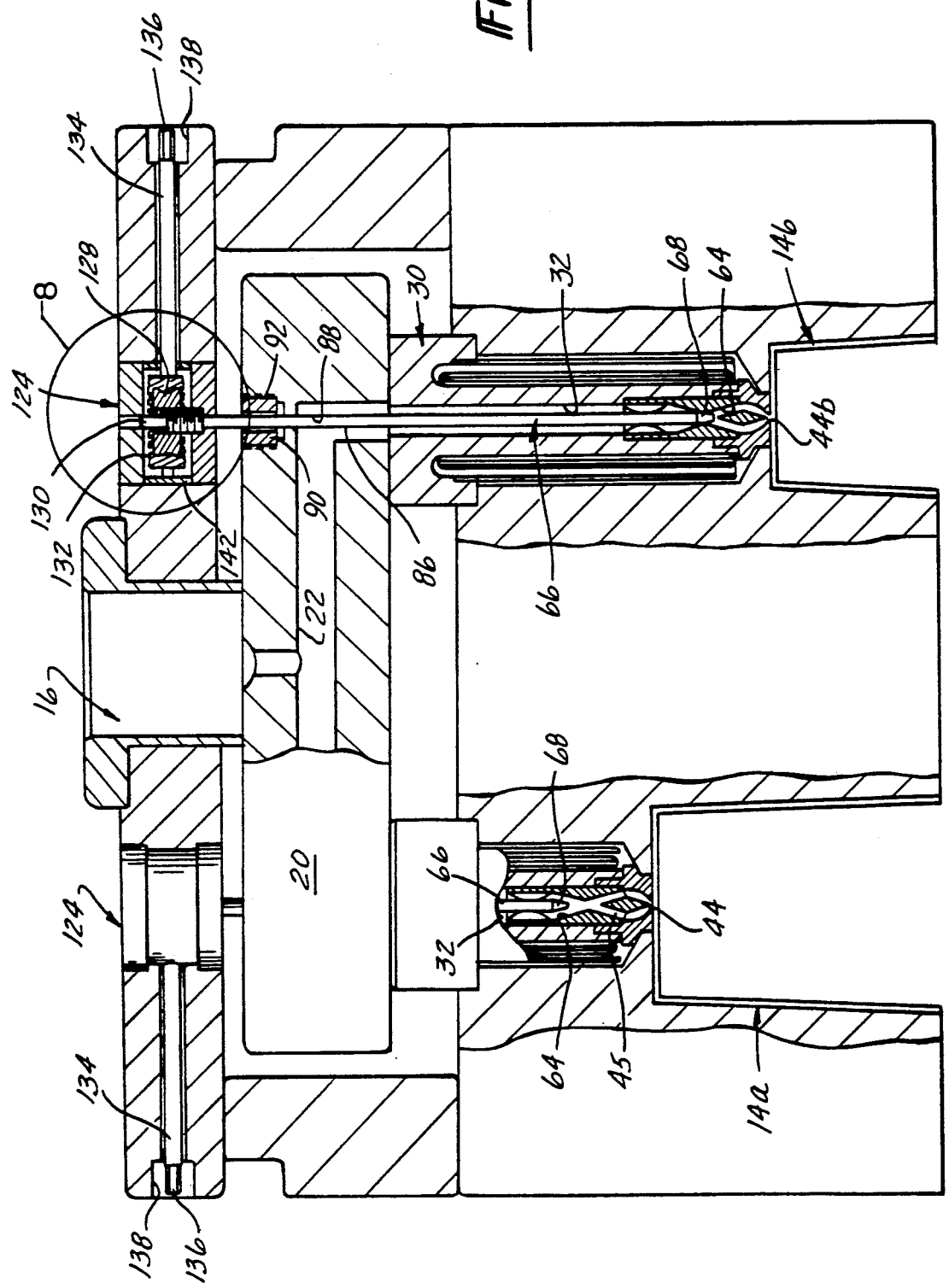
FIG. 7 is a fragmentary partially sectional view of a molding apparatus incorporating a flow adjustment arrangement of a second embodiment of the present invention.
Figure 8:
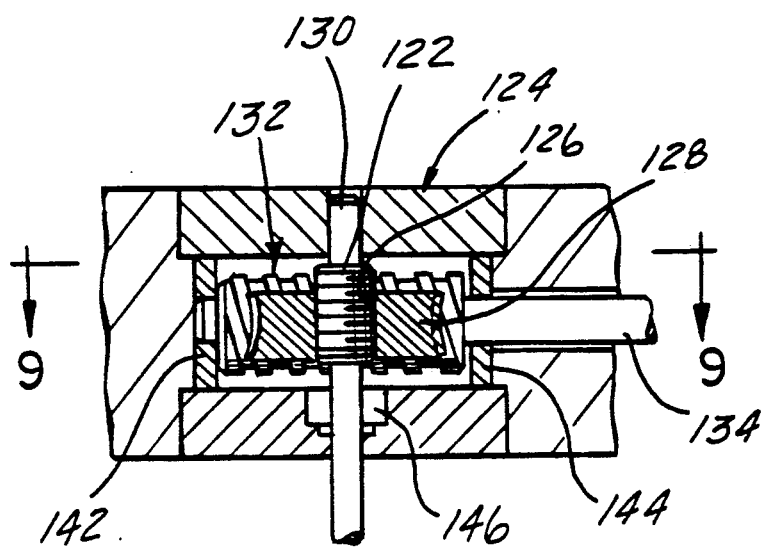
FIG. 8 is an enlarged view of the region within the circle in FIG. 7.
Figure 9:
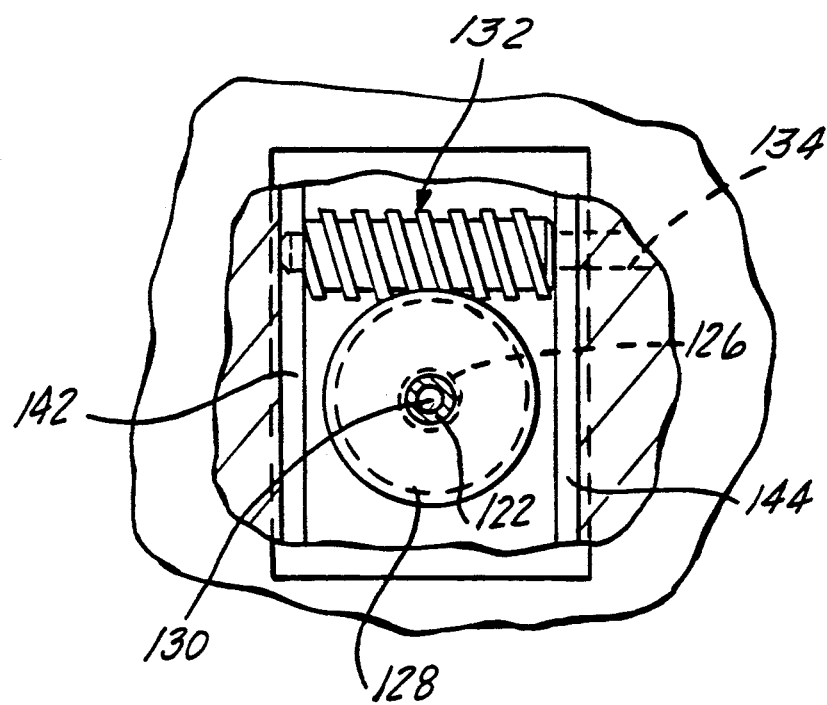
FIG. 9 is a view of section 913 9 taken in FIG. 8.

FIGS. 7 and 8 depict an alternate embodiment in which side accessibility to the adjustment mechanism is enabled to allow flow balance adjustments to be made. Two mold cavities 14a, 14b are shown of differing sizes, fed from the common manifold 20, necessitating a balancing of flow through mold gates 44a, 44b.

In this embodiment, the elongated adjustment pin 66 is mounted extending within passage 32 formed within body member 30, both aligned with the gate 44 into the mold cavity 14a, 14b, as in the above described embodiment.

As before, the pin 66 is formed with a tapered tip 68 positioned within a converging flow passage 64, upstream from a diverging passage 45 immediately upstream of the cavity gate 44a, 44b.

In this embodiment, the position of the pin 66 is adjustable by means of a threaded enlarged diameter section 122 located in a gear housing 124 mounted in mold plate 76. Threaded section 122 is received in a threaded bore 12 of a worm gear 128. The pin 66 is formed with a pilot end 130 received in a bore machined in the gear housing 124 to rotatably mount the worm gear 128.

The worm gear 128 is in mesh with a worm section 132 fixed to cross rod 134 extending transversely to the adjustment pin 66 and having a square drive end 136 protruding to be accessible within counterbore 138 at the side of the mold plate 76.

The end 140 of the cross rod 134 is received in web 142 of the gear housing 124, and together with web 144 serve to axially restrain the worm 128 against reaction to the gear loading reaction forces.

A counterbore 146 is positioned to receive the threaded section 122 from closing movement of the pin 66 downwardly as the cross rod 134 is rotated. The worm gear 128 is axially restrained by the nature of its engagement with worm 132.

Accordingly, the adjustments can be carried out while the mold 10 is mounted in the injection press, since access to the side of the mold is thereby enabled The gear reduction created by the worm gear connection enables fine adjustments more easily, and the self locking nature of the worm gear assures automatic locking of each adjusted position of the assemblage.

I claim:

1. A method of balancing flow in an open loop injection molding apparatus having a plurality of mold cavities supplied with molding material under pressure from a common source of pressurized material by cycling an injection machine to simultaneously supply all of said mold cavities with pressurized material during each cycle of said injection machine, said pressurized material entering said mold cavities through a plurality of gate openings, comprising the steps of:

establishing a converging and thereafter diverging flow of said pressurized material in a flow passage immediately upstream of each of said gate openings;

movably disposing an elongated member aligned within each flow passage to extend lengthwise within said converging flow of material therein;

adjustably restricting the material flow through each gate opening independently by adjusting the lengthwise position of each member within said converging flow to allow flow therepast to increase or decrease said flow so as to equalize the rate of material flow to each gate opening during each cycle of said injection machine;

continuously maintaining said pressurization of material by said injection machine by maintaining communication with said source of pressurized material with each of said gate opening and mold cavities until said material is substantially cured therein.

2. The injection molding method according to claim 1 wherein in said restriction step, said member position is adjusted by manipulation of portions of an element located externally of said flow passages.

3. The injection molding method according to claim 1 wherein in said restricting step an elongated pin is moved axially within said converging flow of material to adjust the rate of flow of material to each respective gate during injection.

* * * * *